Patented Jan. 15, 1929.

1,699,294

UNITED STATES PATENT OFFICE.

WILLIAM HOSKINS, OF CHICAGO, ILLINOIS, ASSIGNOR TO STANDARD OIL DEVELOPMENT COMPANY, A CORPORATION OF DELAWARE.

HOT JOINT PASTE.

No Drawing. Application filed December 6, 1926. Serial No. 153,039.

This invention relates to a hot joint paste for making tight joints between pipes and apparatus which are subjected to high temperatures.

The improved paste consists essentially of finely powdered graphite and the solid constituents of waste liquors from the digestion of wood and the like for paper making. For example, waste sulfite liquors subjected to evaporation yield a solid concentrate or extract, which is suitable for use in the improved paste. Or a partially evaporated waste sulfite liquor containing about 50% water may be used. Similar substances may be derived from waste sulfate liquors and may be used in the production of the improved paste.

The improved paste should contain sufficient water so that it has the desired viscous and adherent properties as will readily be understood by those skilled in the art.

The relative proportions of graphite and the solid sulfite liquor constituents may vary within wide limits. In general, since graphite is the more expensive ingredient, it is preferred to use more liquor extract than graphite, retaining, however, sufficient graphite to serve as a lubricant to facilitate the separation of the parts joined together, when that is desired. The following compositions are given as examples.

Example I.

A paste composed of 40 parts of graphite, 60 parts of dry sulfite liquor extract, intimately mixed with sufficient water to give a viscous or creamy paste.

Example II.

A paste composed of 50 parts of graphite and 50 parts of sulfite liquor concentrate containing about 50% solids, mixed to a viscous or creamy paste.

In use, the paste is applied to the parts to be joined so that it becomes distributed among the screw threads or other uniting surfaces thereof, as will readily be understood by those skilled in the art. Under the action of the heat to which the joint is exposed, the sulfite liquor constituents become carbonized and, together with the graphite, give a tight joint. When it is desired to separate the parts, the graphite serves as a lubricant, facilitating the rotation of screw threaded or other movement between the uniting surfaces.

The solid constituents of the paste may be mixed in the desired proportions and the necessary amounts of water added to form the paste when about to be used, if desired.

I claim:

1. A hot joint paste material comprising graphite, solids from waste paper-making liquor and water.

2. A hot joint paste material comprising graphite and solids from waste paper-making liquor.

3. A hot joint paste consisting essentially of graphite, solids of sulfite liquor and water.

4. A hot joint paste material comprising graphite, and solids from sulfite liquor.

WILLIAM HOSKINS.